United States Patent [19]
Hurst

[11] 4,150,590

[45] Apr. 24, 1979

[54] DRIVE COUPLINGS AND CLUTCHES

[75] Inventor: John W. Hurst, Port Huron, Mich.

[73] Assignee: Chrysler Corporation, Highland Park, Mich.

[21] Appl. No.: 820,182

[22] Filed: Jul. 29, 1977

[51] Int. Cl.[2] .................. F16H 3/60; F16D 13/26
[52] U.S. Cl. .................................. 74/780; 74/792; 192/21; 192/54
[58] Field of Search .............. 74/780, 792; 192/21, 192/54

[56] References Cited

U.S. PATENT DOCUMENTS

| 706,752 | 8/1902 | Holliday | 74/780 |
|---|---|---|---|
| 1,350,324 | 8/1920 | MacMillan | 74/780 |
| 2,351,996 | 6/1944 | Morgan | 192/54 |
| 2,564,466 | 8/1951 | Clifton | 74/792 X |
| 3,703,226 | 11/1972 | Strehler et al. | 192/54 X |
| 3,931,874 | 1/1976 | Braun et al. | 192/54 |

FOREIGN PATENT DOCUMENTS

| 332044 | 1/1921 | Fed. Rep. of Germany | 74/792 |
|---|---|---|---|
| 1348296 | 11/1963 | France | 192/54 |

*Primary Examiner*—Allan D. Herrmann
*Attorney, Agent, or Firm*—Baldwin & Newtson

[57] ABSTRACT

Differential gear sets and planetary gear sets in combination with sets of corresponding radially distributed helical surfaces in drive couplings such as cone clutches. The helical surfaces allow axial movement of the cone members of a clutch selectively into engagement with either of two mating cone members thereby enabling an output member to be selectively driven bidirectionally.

19 Claims, 11 Drawing Figures

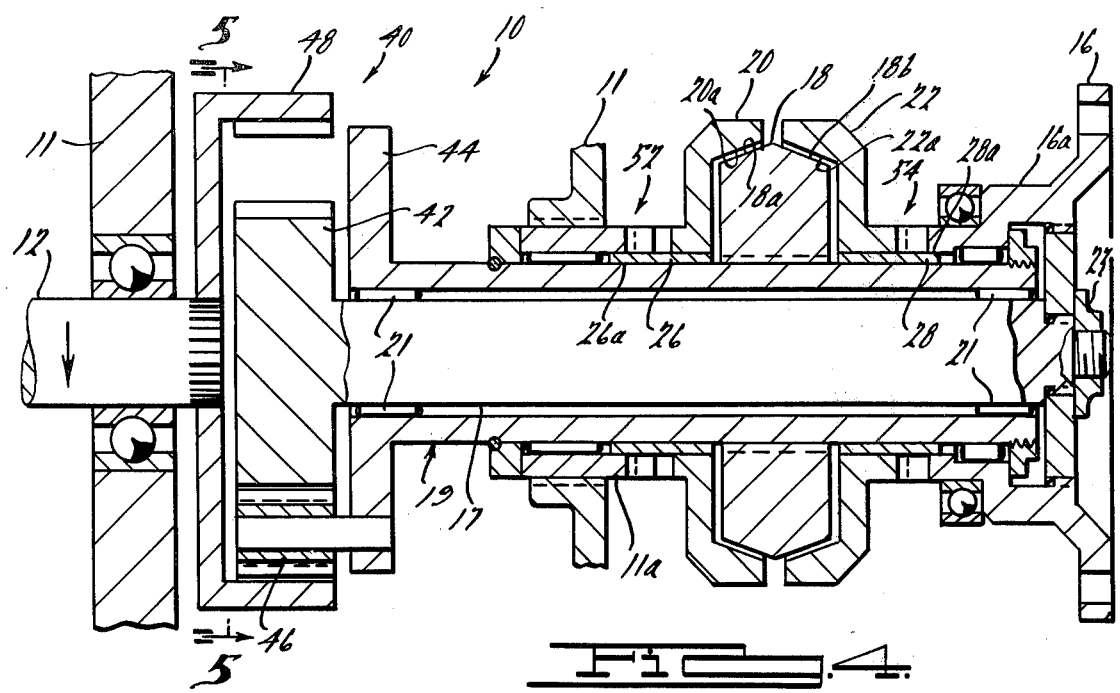
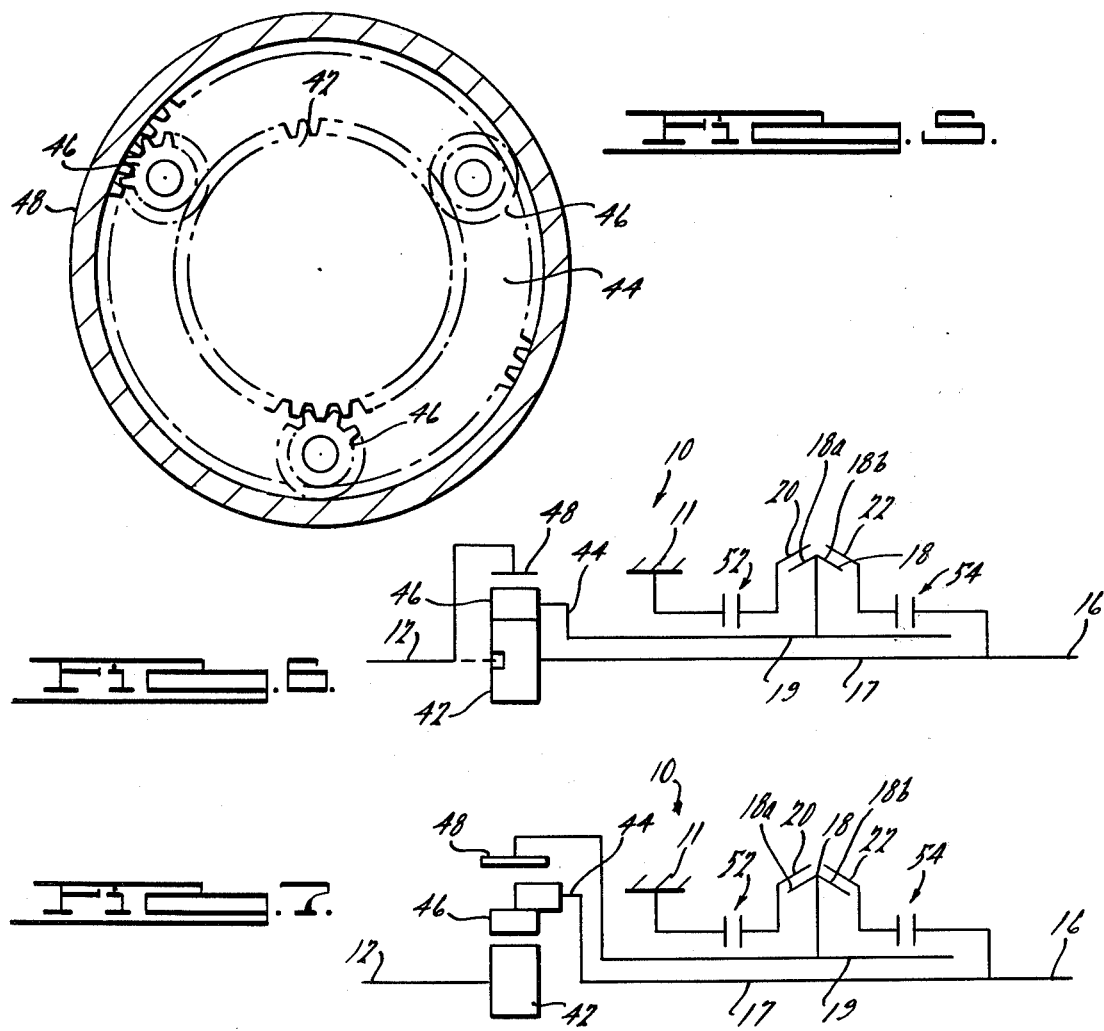

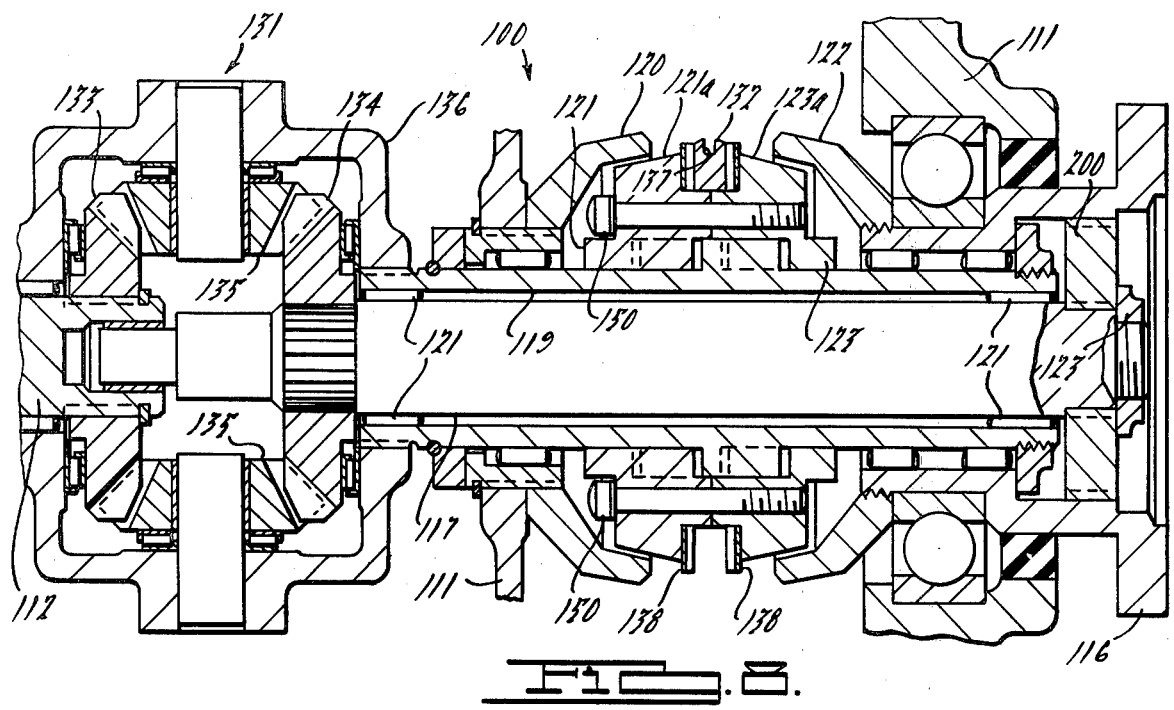
FIG. 8.
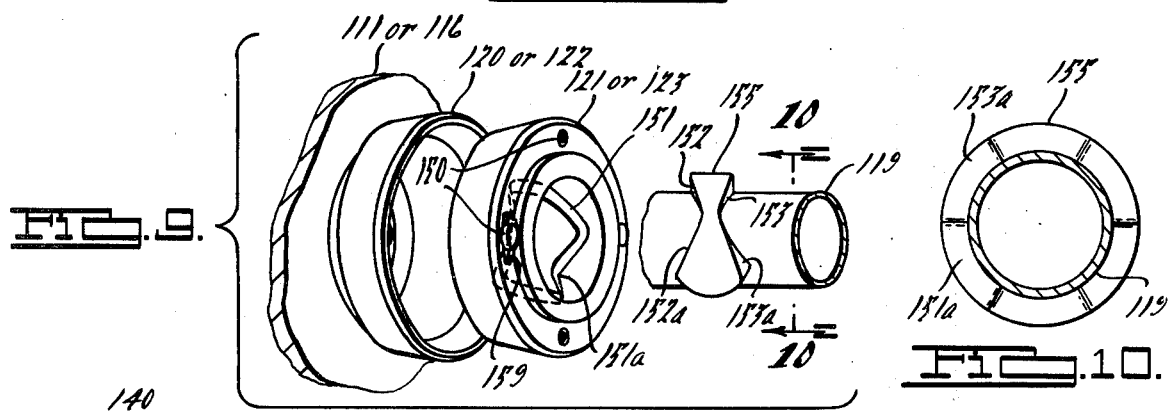
FIG. 9.
FIG. 10.
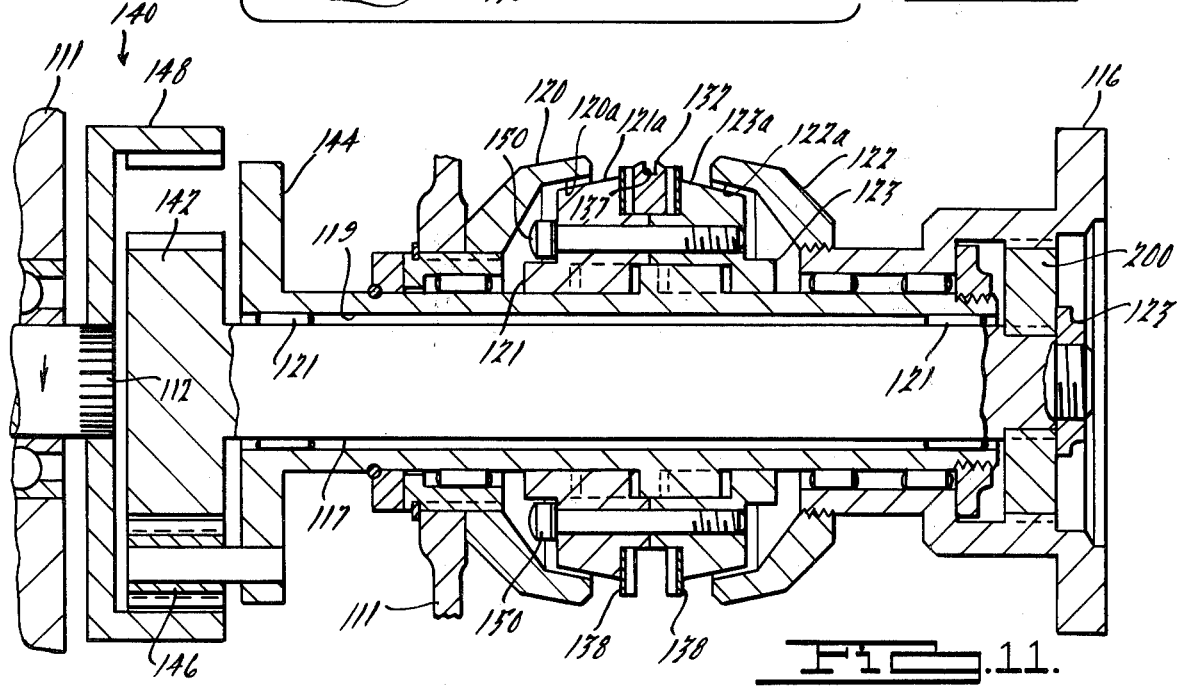
FIG. 11.

DRIVE COUPLINGS AND CLUTCHES

BACKGROUND OF THE INVENTION

The invention relates to drive couplings and clutches. In its most preferred form it comprises a reversible drive coupling for inboard marine engine installations. However, it is not limited to marine application and is useful for other drive devices.

This invention is most closely related to the subject matter of U.S. Pat. No. 3,977,503. An other related patent is U.S. Pat. No. 4,022,308. U.S. patent application Ser. No. 679,529 entitled "Bidirectional Drive Coupling" and U.S. patent application Ser. No. 706,365 entitled "Clutch Shifting Mechanism" also relate to this invention. All of these are incorporated by reference.

SUMMARY OF THE INVENTION

In the preferred embodiments of this invention, corresponding radially distributed paired sets of helical camming surfaces abut in axial overlapping relationship as they extend from portions of coupling members. The paired sets of camming surfaces are able to drivingly engage mutually over a range of axial movement when there is relative rotational movement between them and a coupling member carrying one set is moved axially into contact with a mating coupling member. The coupling members are arranged to transfer an input rotational movement through a differential gear set or a planetary gear set to a bidirectionally output means. In addition, the camming surfaces coact to urge the coupling members into more positive engagement.

THE DRAWINGS

FIG. 4 is a side elevational view partly in section of another preferred embodiment of a clutch drive coupling embodiment showing various features of the invention and incorporating a planetary gear set.

FIG. 5 is a section view taken along line 5—5 in FIG. 4.

FIG. 6 is a schematic line drawing of the embodiment shown in FIG. 4.

FIG. 7 is a schematic line drawing of a variation of the arrangement of parts of the embodiment shown in FIGS. 4 and 6.

FIG. 8 is a side elevational view partly in section showing another preferred embodiment of a clutch drive coupling according to the invention and incorporating a differential gear set.

FIG. 9 is an exploded detail perspective view of portions of FIG. 8 showing a movable male cone and the helical surfaces on abutting portions of the cone and its adjoining shaft member.

FIG. 10 is a section view taken along line 10—10 of FIG. 9.

FIG. 11 is a side elevational view partly in section of yet another preferred embodiment of the invention which incorporates a planetary gear set.

PREFERRED EMBODIMENTS

Figure 1:
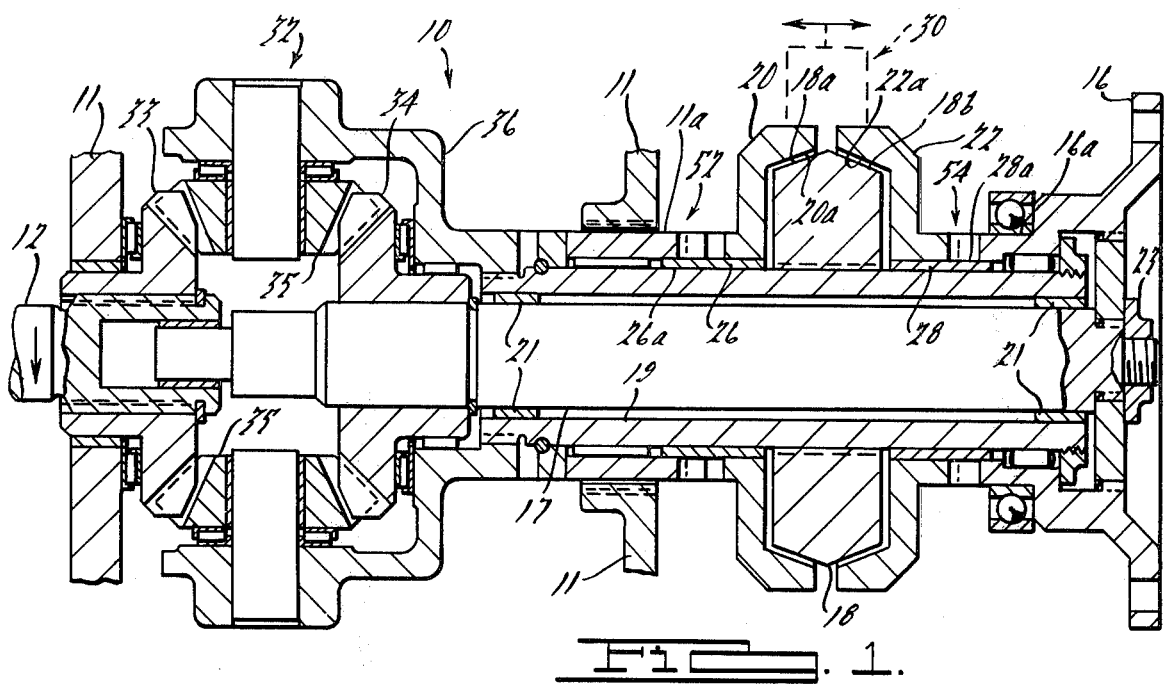
FIG. 1 is a side elevational view partly in section of one preferred clutch drive coupling embodiment showing various features of the invention and incorporating a differential gear set.

FIGS. 1–7 show a reversing drive coupling in the form of a cone clutch, generally designated at 10, having a housing portion 11 shown fragmentarily. A unidirectionally rotated input shaft 12, shaft 17 and a sleeve-like shaft 19, carry various members and elements of the clutch, described below in detail, which coact in combination to provide a selectively reversible rotary output to an output means, such as rotatable flange 16, which is then capable of selectively driving or rotating in either of two reverse rotary directions, arbitrarily termed "forward" and "reverse" herein.

Output shaft 17 carries the coaxial sleeve-like shaft 19, which is supported by any suitable bearings 21 therebetween. Rotatable output flange 16 is splined to shaft 17 and further secured thereto by a nut 33. A pair or set of rotary clutch element means in the form of opposing frusto conical convex faces 18a and 18b are carried by sleeve shaft 19 and rotatable therewith, as by being splined thereto in a fixed position thereon. To one side of the male cone member 18, sleeve shaft 19 carries another clutch element means in the form of an axially movable female cone member 20. To the other side, another clutch element means in the form of an axially movable female cone member 22 is carried by sleeve shaft 19. The female cones have frusto-conical concave interior rim portions or faces 20a and 22a, respectively. Female cone member 20 is carried by sleeve shaft 19 so that the shaft may rotate freely therein and cone 20 may be axially movable over a range of travel toward and away from male cone member 18. Female cone member 22 is similarly carried by shaft 19. This arrangement provides a cone clutch wherein the second and third members 20 and 22 are oppositely coned female clutch members and the first member 18 is a male clutch member including mating coned surfaces 18a and 18b.

Figure 3:
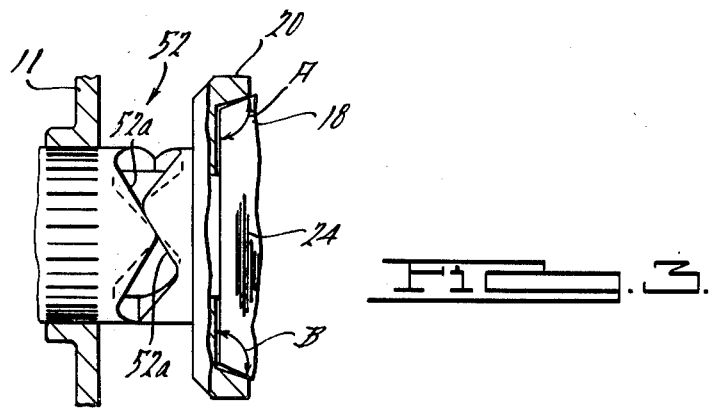
FIG. 3 is a fragmentary view of part of FIG. 1 showing the helical surfaces and the conical surfaces of the members of FIG. 2 in driving engagement.

As in the case with many clutches or couplings, this one is preferably carried inside an enclosing housing 11, (shown only fragmentarily) substantially immersed in oil. It is therefore preferred that either the rim portions of 20a and 22a or the face portions 18a and 18b of member 18, as shown in FIG. 3, for example, be provided with a plurality of very small circumferential grooves 24 arranged to wipe oil from therebetween when any of the surface portions of these members come into mutual contact during operation of the clutch. This may be further understood as to purpose and arrangement by having reference to the teaching set forth in the Society of Automotive Engineers Paper No. 311B entitled *Automatic Transmission Friction Elements* by Froslie, Milek and Smith, which was delivered at the SAE meeting of Jan. 9-13, 1964, with particular reference to pages 2-3 thereof.

To provide stable axial movement of female cone members 20 and 22, they are each fixed to a bushing 26 and 38 respectively, for sliding movement on sleeve shaft 19. Each of the bushings includes an extending portion 26a and 28, respectively, best illustrated in FIG. 2, which provides for stable sliding movement of each female cone on shaft 19 relative to an adjoining clutch member, which receives the extending portions, the extending portions 26a and 28a of the bushings, respectively.

Each female cone member 20 and 22 is provided with means generally designated 30 in FIGS. 1 and 4, for selectively moving the female cone into and out of contact with the male cone member 18. Means 30 may take the form of a pair of arcuate fork members (not shown), each of which is connected to one of the female cones. An arrangement of this type is shown in related U.S. patent application Ser. No. 706,365 referred to hereinabove. A portion of such an arrangement is described hereinbelow in connection with FIGS. 8-10. Means 30 will preferably be designed to provide for the simultaneous movement of the female cone members, as by tying them together for simultaneous movement. This is schematically indicated in FIGS. 1 and 4. With such an arrangement both female cones may be readily placed in a neutral condition relative to the male cone member 18, as shown in FIGS. 1 and 4. Also, one or the other of the female cones may be selectively brought into contact with the male cone member 18 to provide a "forward" or "reverse" driving condition. A driving condition for one direction is illustrated in FIG. 3 which shows the helical surfaces engaged and female cone 20 contacting male cone 18 to provide rotation of output flange 16 in one direction.

Figure 2:
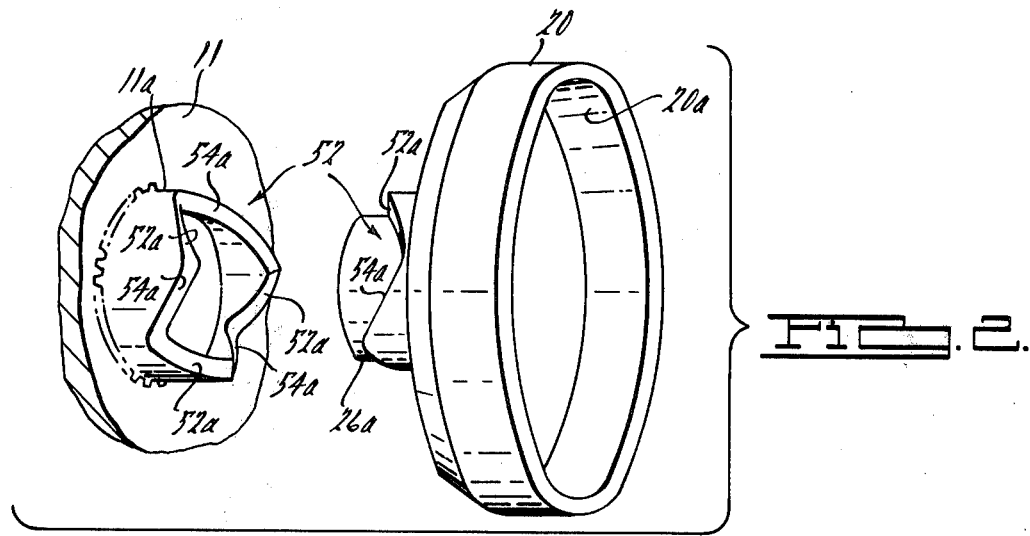
FIG. 2 is an exploded detail perspective view of a part of FIG. 1 showing a female cone member, an adjoining clutch member, and the helical surfaces on abutting end portions of the members.

Interconnection for coaction between the female cone members and a respective adjacent abutting clutch member is constantly provided by sets of a plurality of complementary radially distributed overlapping helical camming surfaces, generally designated at 52 and 54, respectively. As shown in FIG. 2, it is preferred that at least three driving or active helical surfaces be provided on each member of each set. However, two per member or more than three are acceptable.

For these embodiments in FIGS. 1-7, the spiral direction of the helical surfaces is an opposite direction for each cone-abutting clutch member pair 20-11a and 22-16a, i.e., the helical surfaces are "opposite handed" to provide proper coaction for opposite directions of rotation of output flange 16 depending on which cone-abutting clutch member pair is engaged. As is illustrated in FIGS. 2 and 3, the helical surfaces may be symmetrical and thus alternate surfaces may be used to obtain "open handedness." Thus, in FIG. 2, helical surfaces 52a on the female cone-abutting member pair 20-11a would coact to engage when cone 20 is engaged with male cone 18. On the other hand, due to the symmetrical arrangement of the surfaces flipping cone 20 and abutting member 11, as shown in FIG. 2, through 180° will allow one to visualize the surfaces as arranged for the female cone-abutting member pair 22-16a. In such an instance, the engaging action will be through helical surfaces 54a. As shown in FIGS. 2 and 3, the helical surfaces 52a spiral in one direction whereas the helical surfaces 54a spiral in the opposite direction.

Since the helical surfaces of each cone-abutting clutch member of the respective female cone member pair are constantly overlapping over the entire extent of the axial travel of the respective female cone member, constant driving engagement between each female cone-abutting clutch member pair is readily provided when the female cone is brought into contact with the rotating male cone 18. Interaction of the helical surfaces upon rotational movement also provides a positive force which urges the female cone against the male cone to provide the coupling action therebetween. As a result, when female cone 20 is engaged with male cone 18, the helical surfaces at 52 are drivingly engaged. Since member 11 is grounded against rotation, female cone 20, male cone 18, sleeve shaft 17 and members connected to it will also be grounded against rotation. Likewise, when female cone 22 is engaged with male cone 18, the helical surfaces at 54 engaged locking sleeve shaft 19 to shaft 17 for joint rotation through flange 16 and female cone 22.

In the cone clutch of FIG. 1, the rotation of output flange 16 is provided by interaction between the cone members, the abutting clutch members through the overlapping helical surfaces, the shafts 17 and 19 and a differential gear set generally indicated at 32. Differential gear set 32 includes a differential input gear 33, which is fixed to input shaft 12 as by a spline; a different output gear 34, which is fixed to shaft 17 as by a spline; a differential output gear 34, which is fixed to shaft 17 as by a spline, a set of differential pinion gears 35, and a pinion carrier 36. Shaft 12 and gear 33 are suitably journaled into case 11 with a bearing or the like as shown in FIG. 1. Shaft 17 may extend into the central portion of gear 33 for end support and rotation therein as shown. Pinion carrier 36 is fixed to sleeve shaft 19 as by a spline for rotation therewith.

The clutch of FIG. 1 operates as follows. As is common, the rotary output of an engine is normally in one given direction. Thus, rotation of input shaft 12 when driven by an engine will be unidirectional, for example, in the counterclockwise direction indicated by the arrow in FIG. 1 and viewed from the right-hand end of shaft 17 (arbitrarily selected). All references to rotation are made from this vantage point in this specification.

Axial movement of female cone 20 into contact with male cone 18a as shown in FIG. 3 causes lock-up of male cone member 18 and sleeve shaft 19 against rotation due to the engagement of the overlapping helical surfaces 52a and "grounding" of these members to case 11 through abutting clutch member 11a. Consequently, pinion carrier 36 is locked against rotation and the rotary input of shaft 12 and input gear 33 is transferred through the pinions 35 directly to output gear 34, shaft 17 and output flange 16 with an accompanying reversal in rotary direction. During this action, female cone 22 idles on sleeve shaft 19 and is driven by rotating flange 16 through helical surfaces 54.

If female cone 20 is moved away from male cone 18a and female cone 22 is placed in contact with male cone 18b, rotation of output flange 16 occurs in the same rotary direction as that of input shaft 12. This occurs because, with female cone 22 engaged against male cone 18b, helical surfaces 54a engage and lock pinion carrier 36 to female cone 22 via sleeve shaft 19 and male cone 18a. Thus, rotation of input shaft 12 and gear 33 directly causes output gear 34 to rotate in the same direction as input shaft 12.

A neutral condition is provided by placing both female cones 20 and 22 out of engagement with the male cone member 18 simultaneously, as is shown in FIG. 1.

Engagement and disengagement between the conical surfaces of the female cones and the male cone is facilitated by making the conical angles thereof slightly different to obtain a slight mismatch therebetween. For example, as illustrated in FIG. 3, angle A of the male cone face 18a is lesser than angle B of the face 20a of the female cone 20.

In the cone clutch of FIGS. 4-6, the rotation of output flange 16 is provided by interaction between the cone members, the abutting clutch members through the overlapping helical surfaces, the shafts 17 and 19 and a planetary gear set generally indicated at 40. Planetary gear set 40 includes a sun gear 42 which is fixed to output shaft 17 as by a spline; a planet gear carrier 44, which is fixed to shaft 19 as by a spline, a set of planetary gears 46 engaging sun gear 42 and a ring or annulus gear 48, the planetary gears being carried on the planet carrier. Shaft 12 is suitably journaled into case 11 with a bearing or the like as shown in FIG. 4. Shaft 12 may extend into the central portion of sun gear 42 as shown for end support and rotation therein. A bearing may be included as shown. Ring gear 48 is fixed to sleeve shaft 12, as by a spline or any suitable means, for rotation therewith.

The clutch of FIGS. 4–6 operates as follows. Again, the rotation of input shaft 12 and connected sun gear 48 is unidirectional, for example, in the counter-clockwise direction indicated by the arrow in FIG. 4 and viewed from the right-hand end of shaft 17 (arbitrarily selected).

Axial movement of female cone 20 into contact with male cone 18a as shown in FIG. 3 causes lock-up of male cone 18 and sleeve shaft 19 against rotation due to the engagement of the overlapping helical surfaces 52a on the female cone 20 and the abutting clutch member 11 and "grounding" of these members to case 11. Consequently, planet carrier 44 and gear 46 are locked against rotation and the rotary input of shaft 12 and ring gear 48 is transferred through the planet gears 47 causing the sun gear 42 to rotate shaft 17 and output flange 16 with a reversal in rotary direction. During this action, female cone 22 idles on sleeve shaft 19 and is driven by rotating flange 16 with a reversal in rotary direction. During this action, female cone 22 idles on sleeve shaft 19 and is driven by rotating flange 16 through the helical surfaces 54.

If female cone 20 is moved away from male cone 18a and female cone 22 is placed in contact with male cone 18b, rotation of output flange 16 occurs in the same rotary direction as that of input shaft 12. This occurs because, with female cone 22 engaged against male cone 18b, helical surfaces 54a engage and lock planet gear carrier 44 to sun gear 42 via sleeve shaft 19, male cone 18b, female cone 22, helical surfaces 54, flange 17 and shaft 17. Thus, rotation of input shaft 12 and ring gear 48 directly (?) causes rotation of planet carrier 44, sun gear 42, shaft 19, shaft 17 and output flange 16 in the same direction as input shaft 12.

A neutral condition is obtained by placing both female cones 20 and 22 out of engagement with male cone member 18 simultaneously, as shown in FIG. 4.

As with the embodiment of FIG. 1, the conical surfaces of the cones may be mismatched as at A and B of FIG. 3 to facilitate engagement and disengagement.

The arrangement of FIG. 7 shows another embodiment which operates as follows.

1. Reverse–engagement of forward clutch 20 locks or grounds shaft 19 and ring gear 48 through ramps 52 to case 11.
2. Input shaft 12 causes sun gear 42 to rotate and consequently causes planet gear 46 to rotate. The action of the planet gears against locked ring gear 48 causes planet carrier 44 to rotate in the opposite direction of input shaft 12. planet carrier 44 is attached to output shaft 17 and output flange 16.
3. Forward or direct—obtained by locking ring gear 48 and planet carrier 44 together by rear clutch 22 and connecting shafts 17 and 19. Since ring gear 48 and planet carrier 44 are locked together they must rotate in the same direction as sun gear 42. Since output flange 16 is connected to shaft 17, it rotates in the same direction as input shaft 12.

Other arrangements of the clutch members are possible. For example, the function of the male and female cones may be interchanged. This is true for all the various embodiments as is described further hereinbelow.

FIGS. 8–11 show other bidirectional cone clutches of the invention generally designated as 100 and having a housing portion 111 shown fragmentarily. A unidirectionally rotated input shaft 112, shaft 117 and a sleeve-like shaft 119 carry various clutch members and elements, described below in detail, which coact in combination to provide a selectively reversible rotary output to an output means, such as rotatable flange 116, which is then capable of selectively driving or rotating in either of two reverse rotary directions, arbitrarily termed "forward" and "reverse" herein.

Output shaft 117 of this embodiment carries the coaxial sleeve-like shaft 119 which is supported by suitable bearings 121 therebetween. Rotatable flange 116 is connected to shaft 117 by a splined driver 200 and further secured thereto by nut 123. A first pair of clutch elements or female cone members 120 and 122 having frusto-conical concave interior rim portions or engagement faces 120a and 122a, respectively, are carried on sleeve shaft 119 so that the shaft may rotate therein.

Also carried by sleeve shaft 119 and partly rotatable thereon is a second pair of rotary clutch elements or male cone members 121 and 123, each having opposing frusto-conical convex engagment faces 121a and 123a, respectively. The male cones 121 and 123 are connected together, as by several oppositely directed screws 150. As shown in FIG. 8, the head portions of the screws adjoin arcuate slots 159 in each male cone but the screws are screwed into the opposite male cone into which the screws extend in order to allow some slight relative rotational movement between the two male cones while holding them together.

An advantage of this embodiment lies in the fact that shifting may be accomplished with a single shift ring 132 and single shift fork (not shown).

Male cone members 121 and 123 are arranged to be jointly and partially rotatable and axially movable on sleeve shaft 119 over a range of travel such that either male cone surface 121a or 123a may be selectively brought into engagement with female cone surface 120a or 122a, respectively, by axially moving the male cone members in either direction along shaft 119. Also, the male cone members may be axially placed on sleeve shaft 119 in an intermediate or "neutral" position between the two female cone members such that no engagement is made with either of them, as is shown in FIGS. 8 and 11.

The above described arrangement provides a cone clutch. As is the case with many clutches and as previously pointed out hereinabove, the clutch members are preferably carried inside an enclosing housing 111 (shown in fragment) which contains a substantial amount of oil. Consequently, the clutch members may be partially or wholly immersed in lubricating oil (not shown). It is therefore preferred that either engagement faces of 120a and 122a or engagement faces 121a and 123a be provided with a plurality of small grooves, as shown in connection with FIG. 3, which function to wipe oil from therebetween when any of the faces of these members come into mutual contact during operation of the clutch as described herein in connection with the embodiment shown in FIGS. 1-7.

Male cone members 121 and 123 of the embodiments shown in FIG. 8 and FIG. 11 are provided with a shift control partly shown in these FIGS. Since the two male cones are held together by screws 150, a single shift ring 132 may be used for control to selectively move either of the male cone members into and out of contact with the corresponding female cone members. A single arcuate fork member (not shown) may be connected to the male cones by fitting it to the slotted ring 132 as shown in related patent application Ser. No. 706,365. Ring 132 is positioned on the male cone member between two annularly distributed sets of needle bearings indicated at 135 which facilitate rotation of the ring 132 as shown in FIGS. 8 and 11. The making and breaking of contact between a male cone member and the respective female cone member is facilitated with less effort by use of such a bearing arrangement. The bifurcated portions of the fork members (not shown) fit into groove 137 on ring 132 thereby connecting the fork member to the male cone member.

With such an arrangement male cone members 121 and 123 may be readily placed in a neutral condition relative to the female cones by axial movement of the fork member. Also, either of the male cone members may be selectively brought into contact with its mating female cone member to provide a forward or reverse output driving condition from the clutch. A similar driving condition is illustrated in FIG. 3 which shows male cone 18 contacting female cone 20 to provide a "forward" rotary condition (arbitrarily selected) for output.

In the clutch of FIG. 8, the rotation of output flange 116 is provided by interaction between the cone members, the overlapping helical surface sets, shafts 117 and 119, and a differential gear set generally indicated at 131. Differential gear set 131 includes a differential input gear 133, which is fixed to input shaft 112 as by a splint; a differential input gear 133, which is fixed to input shaft 112 as by a spline; a differential output gear 134, which is fixed to shaft 117 as by a spline; a set of differential pinion gears 135, and a pinion gear carrier 136. Shaft 112 and gear 133 are suitably journaled and fitted with bearings as shown for proper fit and function in carrier 136. Shaft 117 may extend into gear 133 for end support and rotation therein as shown and a bearing may be included. Pinion carrier 136 is connected to sleeve shaft 119, as by a spline, for rotation therwith as shown in the FIG.

In the embodiment shown in FIG. 8, female cone 120 is immovably affixed to case 111 or "grounded." Female cone 122 is affixed to output flange 116 for rotation therewith. Output flange 116 is affixed to shaft 117 through Driver 200.

Driving interconnection for coaction between shaft 119 and male cone members 121 and 123 is provided by sets of complementary radially distributed overlapping helical camming surfaces, generally designated at 151, 152, 153 and 154 as best seen in FIGS. 9 and 10. Helical surfaces 152 and 153 constitute the opposite end surfaces of annulus 155 carried on and fixed to sleeve shaft 119. Annulus 155 may be integral with the shaft or merely affixed thereto. Helical surfaces 151 are end surfaces on male cone member 121 and helical surfaces 154 are end surfaces on male cone member 123, best seen in FIGS. 8 and 11. The helical end surfaces in sets 151-152 and 153-154 on adjacent ends of the male cones and shaft annulus 155 are cylindrical in distribution and overlapping and abutting as shown. As shown in FIGS. 8, 9 and 11, it is preferred that at least three driving or active helical surfaces be provided on the ends of each member of each set. However, two per member or more than three are acceptable.

For the embodiment shown in FIGS. 8 and 11, the spiral direction of the helical surfaces is in an opposite direction for each set 151-152 and 153-154, i.e., the helical surfaces are "opposite handed" to provide the coaction resulting in opposite directions of rotation of output flange 116 depending on which set is driving for a given direction of rotation of input shaft 112.

As is illustrated in FIG. 9, the helical surfaces may be symmetrical and alternate surfaces in each set may be used to obtain "opposite handedness." Thus, in FIG. 9, assuming shaft 112 rotation as indicated by the arrow in FIG. 8 or 9, helical surfaces 151-152 coact upon engagement between male cone 121 and female cone 120 to lock pinion carrier 136 and sleeve shaft 119 against rotation. Hence output flange 116 is driven in a reverse direction, relative to the rotation of input shaft 112 by pinion gears 135, output gear 134 and shaft 117.

Again, assuming rotation of shaft 112 in the direction indicated in FIG. 8 or 9, helical surfaces 153-154 coact upon engagement between male cone 123 and female cone 122 to lock shaft 117 and output gear 134 to pinion carrier 136 for joint rotation. Hence, output flange 116 is driven in the same direction as the input shaft 112. Due to the symmetrical arrangement of the helical surfaces, flipping cone 121 180° will allow it to be used and to function as male cone 123 with female cone 122 and vice versa with respect to male cone portion 123.

Since each set of helical surfaces are constantly overlapping over the entire extent of the axial travel of male cones 121 and 123, relative to fixed annulus 155, constant driving engagement between male cones 121 and 123 and shaft 112 is readily provided when a male cone engages a female cone and is then brought into contact with helical surfaces on annulus 155 as sleeve shaft 119 rotates against the lagging movement of a male cone. Interaction of the helical surfaces upon rotation of shaft 119 also provides a positive force which urges the male cone against the corresponding female cone to provide the coupling action therebetween.

The clutch embodiment described in FIG. 8 operates as follows. As previously stated, the rotary output of an engine is normally in one given direction. Thus, rotation of input shaft 112 will be unidirectional, for example, in the direction indicated by the arrow near shaft 112 in FIG. 8. Axial movement of male cone 121 into contact with female cone 120 causes sleeve shaft 119 and pinion carrier 136 to be locked against rotation through the engaged overlapping helical surfaces 151-152 and fixed cone 120. Rotation of output flange 116 occurs in a rotary direction opposite that of shaft 112 due to counter-rotation of pinions 135 which are rotated by shaft 112 and in turn rotate output gear 134 and shaft 117. During this action, female cone 122 idles on sleeve shaft 119.

If male cone 121 is moved away from female cone 120 and male cone 123 is placed in contact with female cone 122, shaft 117 is locked to shaft 119 and pinion carrier 136 for joint rotation therewith. The rotation of shaft 117 and output flange 116 consequently is in the same direction as that of input shaft 112.

As before, engagement and disengagement between the conical surfaces of the female cones and the male cones may be facilitated by making the conical angles thereof slightly different to obtain a slight mismatch therebetween.

In the drive coupling embodiment of FIG. 11 the rotation of output flange 116 is provided by interaction between the cone members, the overlapping helical surface sets, shafts 117 and 119 and a planetary gear set generally indicated at 140. Planetary gear set 140 includes a ring gear 148 which is fixed to shaft 112 as by a spline; a planet gear carrier 144, which is fixed to shaft 119 as by a spline, a set of planetary gears 146 engaging the sun gear 142 and a ring or annulus gear 148, the planetary gears being carried on planet carrier 144 to provide a planet arrangement of the type shown in FIG. 5. Shaft 117 may extend into shaft 112 for end support and rotation therein and a bearing may be included as shown. Ring gear 148 is connected to input 112, as by a spline or any suitable means, for rotation therewith.

The coupling of FIG. 11 operates as follows. Again the rotation of input shaft 112 and connected ring gear 148 is unidirectional for example in the counter-clockwise direction indicated by the arrow in FIG. 1 and view from the right-hand end of shaft 117.

Axial movement of male cone 121 into contact with female cone 120 causes lock-up of male cone 121 and sleeve shaft 119 against rotation due to the engagement of the overlapping helical surfaces 151-152. Consequently, Planet Carrier 144 is locked against rotation and the rotary input of shaft 112 and ring gear 148 is transferred through the planet gears 146 causing the sun gear 142 to rotate shaft 117 and output flange 116 with a reversal in rotary direction relative to input shaft 112. During this action, female cone 122 idles on sleeve shaft 119 and is driven by rotating flange 116 through the helical surfaces 154.

If male cone 121 is moved away from male cone 120 and male cone 123 is placed in contact with female cone 122, rotation of output flange 116 ocurs in the same rotary direction as that of input shaft 112. This occurs because, with male cone 123 engaged against female cone 122, helical surfaces 153-154 engage and lock sun gear 142 to the planet carrier 144 via sleeve shaft 119, male cone 123, female cone 122, helical surfaces 153-154, flange 116 and shaft 117. Thus, rotation of input shaft 112 and ring gear 148 causes rotation of planet carrier 144, shaft 119, sun gear 142, shaft 117 and output flange 116.

A neutral condition is obtained by placing both male cones 121 and 123 out of engagement with female cone members 120 and 122 simultaneously.

As with the other embodiments the conical surfaces of the cones may be mismatched as at A and B of FIG. 3 to facilitate engagement and disengagement.

I claim:

1. In combination, a drive coupling comprising:
    a gear set 32 having rotatable gear members including input means 33 for providing unidirectional rotational input to the set, output means 34 for selectively providing bidirectional rotational output from the set and support means 36 carrying at least one interconnecting gear member 35, the set being adapted and arranged such that, when any two of the input, output and support means are jointly rotated, unidirectional rotation of the input means 33 provides rotation of the output means 34 in either one of the two opposite rotational directions depending upon which of the two members are jointly rotated;
    output means including a shaft 17 connected to the output gear member of the gear set for rotation thereby;
    driving transmitting means 19 coaxial with at least a longitudinal portion of the output means shaft 17;
    a plurality of spaced rotary clutch element means 18, 20, 22 carried on drive transmitting means 19 in a serial array;
    first means 52 connecting one of the clutch element means 18, 20, 22 at one end of the array to ground;
    second means 54 connecting another of the clutch element means 18, 20, 22 of the array to the drive transmitting means;
    the first and second connecting means being characterized in that one of them includes at least one paired set of separate and adjacent portions adapted and arranged to provide for limited axial movement of the clutch element means connected therewith and being further characterized in that the adjacent portions include a paired set of complementary, radially distributed, overlapping helical camming surfaces 52a, 54a, the surfaces of the set extending from the adjacent portions respectively, in mutual overlapping relationship, to couple the portions together over the complete range of axial movement of the clutch element means whereby engagement between the respective set of camming surfaces urging the engaged clutch element means against each other for more positive engagement; and
    means 30 for selectively engaging the clutch element means of the array.

2. The combination of claim 1 in which the gear set comprises a differential gear set.

3. The combination of claim 1 in which the gear set comprises a planetary gear set 40.

4. The combination of claim 1 in which the first connecting means includes two paired sets of the adjacent portions, the first set 52 being included between the one clutch element means 20 at one end of the array and ground, the second set 54 being included between the other clutch element means 22 at the other end of the array and the output means, each pair of the adjacent portion sets including the paired set of complementary, radially distributed, helical camming surfaces 52a, 54a whereby the two end clutch element means 20, 22 are movable with respect to the intermediate clutch element means 18; the combination additionally including means 30 for selectively moving one or the other of the movable clutch element means into engagement with the intermediate clutch element means.

5. The combination of claim 4 in which the rotary clutch element means array comprises two pairs 20, 18; 22, 18 of oppositely coned male and female cone elements.

6. The combination of claim 5 in which the end clutch element means 20, 22 comprise the female cones.

7. The combination of claim 4 in which the gear set comprises a planetary gear set 40 and the combination additionally includes means connecting the planet carrier 44 thereof to the drive transmitting means 12 for joint rotation therewith, and means connecting the sun gear 42 thereof to the output means 17 for joint rotation therewith.

8. The combination of claim 7 in which the rotary clutch element means comprises two pairs of oppositely coned male and female cones, and the male clutch elements 18a, 18b are axially fixed to the drive transmitting means 19 for joint rotation therewith.

9. The combination of claim 4 in which the gear set comprises a planetary gear set 40 and the combination additionally includes means connecting the planet carrier 44 thereof to the input means 12 for joining rotation therewith, and means connecting the sun gear 42 thereof to the drive transmitting means for joint rotation therewith.

10. The combination of claim 9 in which the rotary clutch element means comprises two pairs of oppositely coned male and female elements, the end clutch elements 20, 22 comprising the female cones, and the male clutch elements 18a, 18b are axially fixed to the drive transmitting means 19 for joint rotation therewith.

11. The combination of claim 4 in which the gear set comprises a differential gear set 32 having a pinion gear carrier 36 and the combination additionally includes means connecting the pinion gear carrier 36 to the drive transmitting means 19 for joint rotation therewith.

12. The combination of claim 11 in which the rotary clutch element means comprises two pairs of oppositely coned male and female elements, the end clutch elements comprising the female cones 20, 22, and the male clutch elements 18a, 18b are axially fixed to the drive transmitting means 19 for joint rotation therewith.

13. The combination according to claim 1 in which the intermediate clutch element means comprises two clutch members 120, 122 and the second connecting means includes two paired sets 151, 152, 153, 154 of the adjacent portions, one set being interposed between each of the two clutch members, respectively, and the drive transmitting means, each pair of the sets further including at least one pair of the complementary, radially distributed, helical camming surfaces 151a, 152a, 153a, 154a whereby the intermediate clutch element means are longitudinally movable with respect to the driving transmitting means 131; the combination additionally including means for selectively moving one or the other of the intermediate clutch element means members into engagement with one or the other of the clutch element means at the end of the array, respectively.

14. The combination of claim 13 in which the rotary clutch element means comprises two pairs of oppositely coned male 121, 123 and female clutch elements 120, 122.

15. The combination of claim 14 in which the intermediate clutch elements comprise the male cones 121, 123.

16. The combination of claim 13 in which the gear set comprises a planetary gear set 40 and the combination additionally includes means connecting the planet carrier 44 thereof to the drive transmitting means 19 for joint rotation therewith and means connecting the sun gear 42 thereof to the output means 17, for joint rotation therewith.

17. The combination of claim 16 in which the clutch element means comprises two pairs of oppositely coned male 121a, 123a and female elements 120, 122, the intermediate clutch elements comprising the male cones 121a, 123a, and the female cones are axially fixed with respect to the male cones.

18. The combination of claim 13 in which the gear set comprises a differential gear set 32 having a pinion gear carrier 36 and the combination additionally includes means connecting the pinion gear carrier 36 to the drive transmitting means for rotation therewith.

19. The combination of claim 18 in which the rotary clutch element means comprises two pairs of oppositely coned male 121a, 123a and female elements 120, 122, the intermediate clutch elements comprising the male cones 121a, 123a, and the female cones are affixed axially with respect to the male cones.

* * * * *